MAGNETIC CORE MEMORY MATRIX

Filed Aug. 9, 1956 2 Sheets-Sheet 1

INVENTOR
J. H. McGUIGAN
BY Kenneth B Hamlin
ATTORNEY

MAGNETIC CORE MEMORY MATRIX

Filed Aug. 9, 1956 2 Sheets-Sheet 2

INVENTOR
J. H. McGUIGAN
BY
Kenneth B Hamlin
ATTORNEY 3,016,521

MAGNETIC CORE MEMORY MATRIX

John H. McGuigan, New Providence, N.J., assignor to Bell Telephone Laboratories, Incorporated, New York, N.Y., a corporation of New York Filed Aug. 9, 1956, Ser. No. 603,010
18 Claims. (Cl. 340—174)

Figure 1:
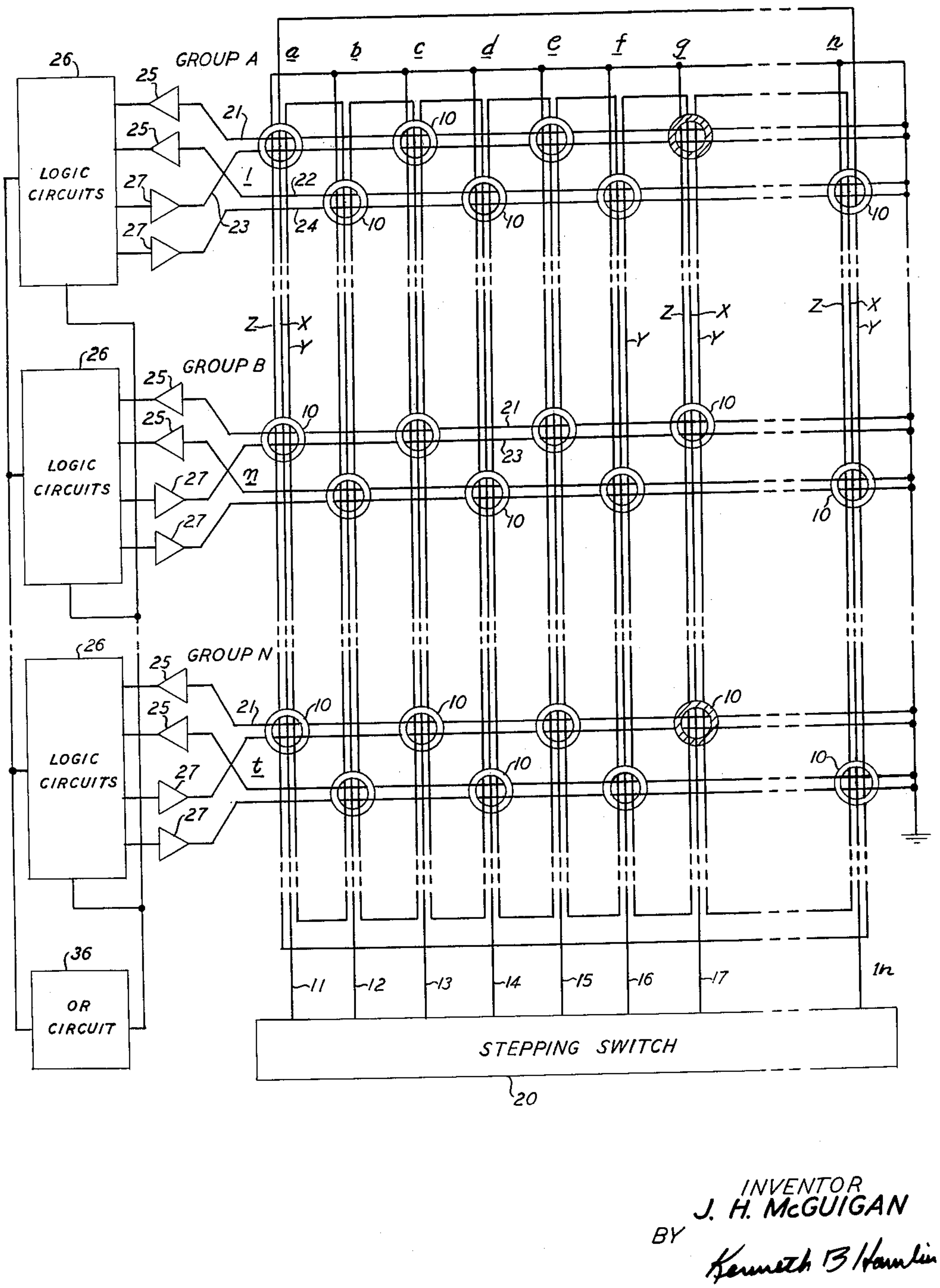

This invention relates to information handling systems and more particularly to magnetic core memory arrangements suitable for use in such systems.

Magnetic cores exhibiting substantially rectangular hysteresis characteristics, because of their ability to permanently store information values in the form of one or the other condition of remanent magnetization, have found wide application in information handling and processing systems. Because of their ability to retain information stored and because of the ease with which the information to be stored may be introduced into a core system and subsequently detected, magnetic cores have been found particularly suited to constitute the basic storage element in memory matrices capable of storing quantities of binary information. In such memory matrices each magnetic core stores a binary "bit" of information as determined by the stable bipolar magnetic conditions available to represent information stored, with each group of such cores then being capable of representing a "word" of stored information.

Information stored in a magnetic core of a memory matrix is read out by applying a magnetomotive force of an appropriate magnitude and direction to the particular core being interrogated to tend to switch the remanent magnetization of that core to a particular polarity. If a switching action occurs this will indicate, by the presence of an induced voltage on a detection lead, that the bit stored in the interrogated core was of a particular binary value. If no switching action occurs with a resulting absence of an effective induced voltage on the detection lead, the bit stored in the interrogated core will be indicated as being of another binary value of information. The writing operation is accomplished in a similar fashion. By applying or omitting to apply an appropirate magnetomotive force to a particular core in which information is to be stored, the particular core is set, or permitted to remain, in a condition of remanent magnetic saturation representative of the binary information value it is desired to store therein. An illustrative magnetic core memory arrangement in which the reading and writing operations are performed in substantially this manner is that of the copending application of C. W. Rosenthal, Serial No. 478,805 filed December 30, 1954 now Patent No. 2,922,988.

In the memory matrix arrangement of the application cited, as well as other known arrangements, problems relating to the access to particular information stored and the time in which this information can be detected, analyzed, and then optionally reintroduced into the memory are encountered. Access to information bits stored in cores of particular addresses within the matrix is readily had in prior known matrices by the application of coincident switching current pulses applied to switching leads defining the particular core interrogated. Thus in a coordinate array matrix, each row and column of cores has threaded therethrough a switching lead. To examine the contents of a particular core, coincident currents, singly producing insufficient magnetomotive force to switch the core, are applied to the row and the column switching lead intersecting at that core. The additive effect of the coincident currents will switch the magnetic condition of that core assuming an information bit stored therein having a value represented by a remanent magnetization of a polarity opposite to that of the magnetomotive force produced by the coincident switching currents. Individual cores can be readily interrogated in this manner, either at random or sequentially within a core matrix simply by suitably controlling the coincident switching currents applied to the coordinate switching leads. The particular address of a core also is readily determinable by identification of the particular coordinate switching leads upon which the effective coincident currents appear.

Many applications of magnetic core memory matrices require that information stored in the cores be read out in the manner described above, compared in external circuitry with other information and then the original or new information as determined by the comparison made is reintroduced into the cores of the matrix. In most prior matrices these operations are performed sequentially with an attendant time demand which render these circuits disadvantageous in systems in which extremely short read and rewrite times are a requirement. One means of appreciably reducing this time has been accomplished by Rosenthal in the circuit arrangement of the copending application referred to hereinbefore. In that matrix arrangement the read-out and rewrite operations are separated physically with the result that some portions of the operations can be permitted to overlap in time. A resultant reduction in the time required to complete a full cycle of read and rewrite operation is thus achieved. In this arrangement, in order to accomplish the overlapping of operative steps, it is necessary to return compared information back to the matrix into cores other than the cores originally interrogated. In the illustrative embodiment of the matrix of the cited application this information is returned to an immediately preceding core with the result that the information stored in the cores precesses through the matrix responsive to the sequential application of the switching currents. The address of any particular word of information is thus also disassociated from the physical location of the cores in which the information momentarily appears, the address itself also being stored in the matrix and precessing with the information word the location of which it establishes.

In spite of the high access and rewrite speed attained by the particular overlapping operations as outlined hereinbefore, system requirements may at times be such as to demand even higher speeds. Thus the imposition of a time limit in the order of, say, 2 microseconds in which to complete a full cycle of operation comprising the gaining access to a particular address, reading out the information value stored therein, processing the information as required, and finally rewriting information in the matrix would demand a memory arrangement not heretofore available.

Accordingly, it is an object of this invention to provide an improved memory matrix utilizing magnetic cores as basic storage elements in which access and information processing time is reduced to a time duration below that available in any of the known memory matrices.

It is another object of this invention to increase the read and rewrite speed of a magnetic core memory matrix by accomplishing these operations substantially simultaneously during a single interrogating cycle.

Another object of this invention is to perform the reading operation of information stored in a magnetic core memory matrix together with comparing the information so read with other external information and then reintroducing information based on the results of the comparison in the matrix without an employment of additional intermediate information storage means.

A further object of this invention is to provide an improved magnetic core memory circuit in which information stored therein is precessed through the memory circuit as a concomitant of the reading and writing operations.

A still further object of the present invention is to provide an improved coincident current memory matrix in which switching current coincidence is simultaneously present in a first column due to the physical disposition of the associated column switching lead and in a second column due to the physical disposition of the same column switching lead and intersecting row switching leads.

The foregoing and other objects are realized in one specific illustrative embodiment of this invention by an arrangement of magnetic cores in rows and columns. The cores of each of the columns have threaded therethrough a switching lead, the threading being such that the switching lead passes through the cores of its associated column, is returned through the cores of a preceding column, and then threaded again through the cores of the associated column. Each column of cores, as a result, has twice threaded therethrough its associated column switching lead and once the switching lead of a succeeding column. The column switching leads may be connected to a sequential stepping switch which may also be of the magnetic core type. Associated with the corresponding cores of each of the columns of cores is a read and a rewrite lead, the last-mentioned pair of leads threading alternate cores of the rows of cores. Each row of cores will thus have two pairs of read and rewrite leads associated therewith. External logic circuitry is provided to process the information signals read from the matrix and to supply coincident switching currents responsive thereto to the cores.

A feature of this invention accomplishing the hitherto unknown high speed of information read and rewrite is a novel means of applying the coincident switching currents to the cores. Current pulses of substantially half the magnitude necessary to provide the magnetomotive force to switch the remanent magnetization of a core are sequentially supplied by the stepping switch. Any of the cores in a column having threaded therethrough a switching lead to which a half magnitude current pulse is applied and being in a condition of remanent magnetization opposite to that of the applied magnetomotive force will be switched to the opposite remanent condition and, in accordance with well-known principles, a voltage signal will be induced in the row read lead threading the particular cores of a column switched. The signals or absence of signals will be indicative of the information stored in the column being interrogated by the current pulses applied by the column stepping switch. It should be noted that the switching action in the column of cores interrogated is accomplished by the doubling effect of the half magnitude switching current pulses appearing on both portions of the switching lead threading a column of cores. It follows therefore that since the column switching leads thread a preceding column of cores only once, the half magnitude current pulses will alone be insufficient to switch any of the cores in that preceding column.

The information represented by the signals induced on a read lead by action of the doubled switching currents may be compared in external logic circuitry with other information and, as determined by this comparison, may be returned to the matrix or other information may be substituted therefor. Information to be rewritten is introduced into the matrix either as switching current pulses also of substantially one-half the magnitude necessary to provide a magnetomotive force sufficient to switch the magnetic conditions of a core or the absence of such current pulses. To introduce a bit of information into a core of a row a half magnitude current pulse is applied to a rewrite lead of the pair of leads other than the pair of which the read lead originally having the information signal thereon is a member. The last mentioned current pulse is applied during the time that the original half magnitude switching current pulse is applied to a column of cores, the latter current pulse being of sufficient duration to overlap in time the rewrite current pulse applied responsive to the core switching which in turn resulted from the application of the current pulse applied to a column. The two half magnitude current pulses, that is, the pulse on the rewrite lead and the pulse on the column switching lead threading once the column in whiih the information is to be rewritten, are additive, with the result that the cores of the last-mentioned column having rewrite leads threaded therethrough upon which half magnitude current pulses appear and a single, column switching lead upon which a half magnitude current pulse appears will be switched to the opposite condition of magnetic saturation indicative of information values stored therein. The latter cores, when switched to store a binary information value "1" are said to be "set," whereas when the magnetic condition of a core is switched to read out an information value "1" the core is said to be "reset."

According to one aspect of this invention, as is readily evident from the above description, it is another feature thereof to provide for the precessing of information stored in the matrix by the virtually simultaneous rewriting of information responsive to the reading operation, the rewriting being performed in a column other than the column from which the information was read out. The term "precess" as used herein thus designates the forward movement in one direction of the stored information rather than its permanent destruction by the sequential read-out pulses applied in the other direction by analogy to the well-known precessional movement imparted to a rotating body in equilibrium by a force tending to destroy that equilibrium.

Figure 3:
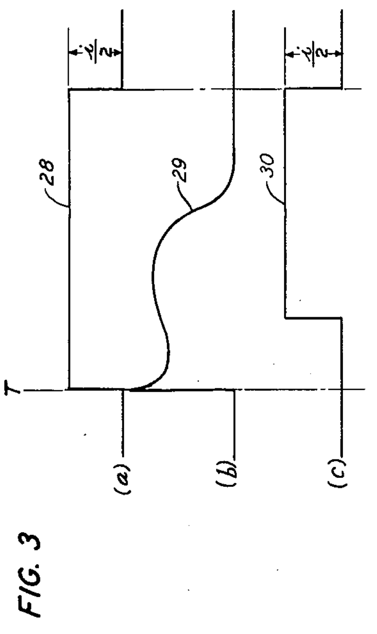
Figure 2:
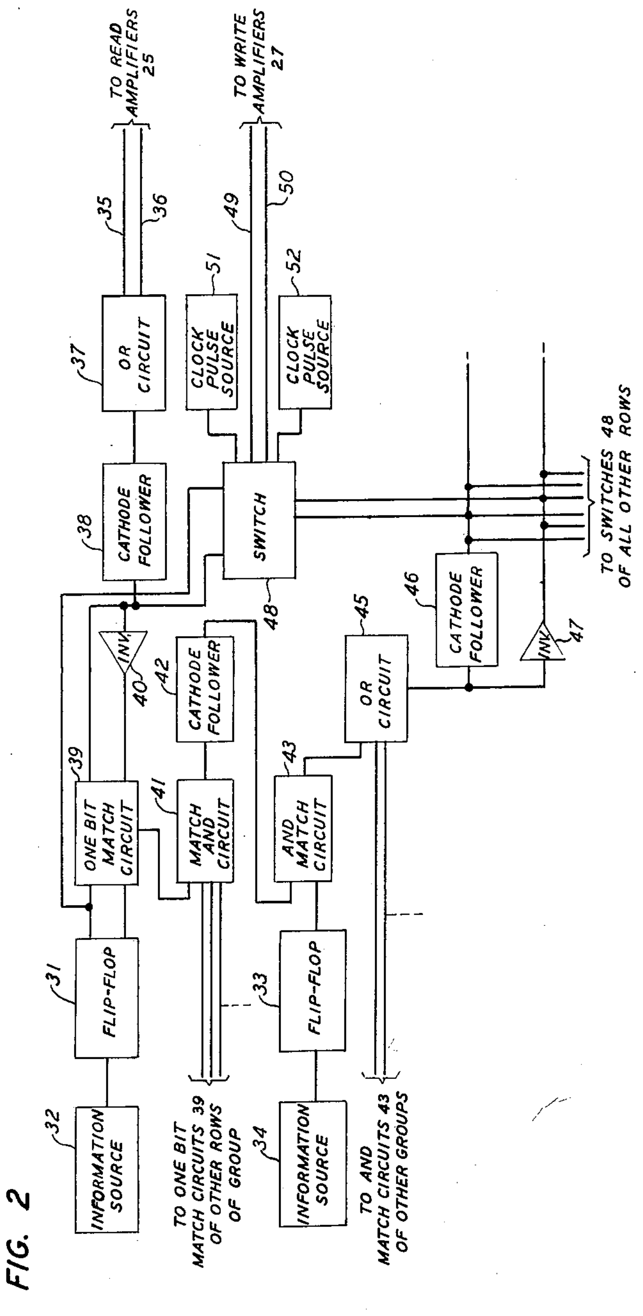

This invention together with its objects and features may be better understood from a consideration of the detailed description of one illustrative embodiment thereof when taken in conjunction with the accompanying drawing in which:

FIG. 1 shows a representative portion of an illustrative magnetic core matrix arrangement embodying the principles of this invention and the relative disposition of the column switching leads and the pairs of read and rewrite leads associated with the rows of cores. The cores of each row are shown staggered to facilitate the showing of the alternate threading of the pairs of row leads;

FIG. 2 is a generalized representation of illustrative logic circuitry individual to each of the rows of cores of the memory matrix of FIG. 1 for analyzing the information read out of the cores of a column and supplying current pulses for rewriting information in a preceding column; and FIGS. 3(*a*), (*b*), and (*c*) are graphical representations of the half magnitude switching current pulse applied to the column switching leads, the signal induced on a read lead by doubled half magnitude switching current pulses, and the half magnitude switching current pulse applied to a row rewrite lead, respectively. The pulses are shown in substantially the time relationship in which they occur in the operation of this invention.

Referring now to the drawing and particularly to FIG. 1 thereof, the memory matrix according to this invention, a representative portion of which is shown, is seen to comprise an array of magnetic cores, each core 10 of which displays substantially rectangular hysteresis characteristics. The cores 10 are arranged in rows *l*, *m*, . . . *t*, and in columns *a*, *b*, *c*, *d*, *e*, *f*, *g*, . . . *n*, the cores 10 of each row being conveniently shown as staggered to avoid confusion in depicting leads associated therewith. Each core 10 of each column of cores has threaded therethrough a switching lead such as the leads 11, 12, . . . 1*n*. The latter leads thread the cores 10 of a column of cores in a manner such that a portion *x* of the lead threads a column of cores in one direction, a second portion *y* passes back through the cores 10 of a preceding column of cores in the opposite direction, and a third portion $z$ passes again through the cores 10 of the first column of cores in the original direction. Thus, designating each core by its row and column location, the switching lead 11 has a portion of its length passing through the cores *ta*10, *ma*10, and *la*10, a portion $y$ passing through the cores *ln*10, *mn*10, and *tn*10, and a portion $z$ passing again through the cores *ta*10, *ma*10, and *la*10, the switching lead 11 finally being connected to ground.

The leads 11 through 1*n* are connected to successive outputs of any suitable sequential stepping switch 20 capable of producing sequential switching current pulses to be described hereinafter. The switch 20 may advantageously be a switch also utilizing magnetic cores, for example, of the general character described in M. Karnaugh, Patent 2,719,961, issued October 4, 1955.

Each of the rows of cores has associated therewith a pair of read leads 21 and 22, and a pair of write leads 23 and 24, the leads being threaded through the cores of a row in a manner such that a read lead and a write lead of each pair thread alternate cores 10 of a row. Thus, a read lead 21 and a write lead 23 associated with the row of cores $l$, for example, thread the cores *a*10, *c*10, *e*10, and *g*10 and a read lead 22 and a write lead 24 thread the cores *b*10, *d*10, *f*10, and *n*10 of the same row. Each of the read leads 21 and 22 is terminated in an amplifier 25 which may advantageously be of any suitable construction to deliver responsive to an input signal, a signal of appropriate polarity and amplitude. Additionally each row of cores 10 has associated therewith logic circuitry 26 of a character readily available in the art whereby information in the form of signals of a particular polarity appearing on the read leads 21 and 22 is compared with information furnished by an external source and is returned to the storage cores 10 altered or unaltered, as determined by the comparison, by means of the write leads 23 and 24. Information to be returned to the cores 10 is applied to the write leads 23 and 24 through amplifiers 27 individually connected to each of the write leads 23 and 24. The amplifiers 27 may conveniently be of any well-known construction and may, for example, be of the blocking oscillator type in which conduction will occur only in response to a trigger pulse from an external source, which source herein would comprise the logic circuits 26.

An illustrative circuit 26 for accomplishing logic operations for the rows of cores of this invention may be a circuit such as that depicted generally in FIG. 2 of the drawing. The elements of the illustrative circuits 26 comprise well-known AND gates and OR mixer circuits together with associated inverter and cathode follower stages and need not be described with particularity herein. Although other arrangements for the application of the principles of this invention may advantageously be devised by one skilled in the art, the circuits 26 assume the rows of cores to be assembled in groups. The first group designated as group A comprising the rows $l$ through $(m-1)$, the second group B comprising the rows $m$ through $(t-1)$, and the Nth group N comprising the rows $t$ through $z$. In FIG. 1 of the drawing only the first row of each group is shown.

Before the operation of the logic circuits 26 is described however, the reading and writing operations as they are performed with respect to particular cores of the matrix will be described.

Assuming for purposes of description that an information value "1" represented by a condition of remanent magnetization of a particular polarity is contained in each of the cores 10 of the column of cores $g$ shown as shaded. These cores are said to be "set" when such a value is contained therein. A series of current pulses of substantially the magnitude $$\frac{i}{2}$$

is now supplied sequentially to the switching leads 11 through 1*n* by the stepping switch 20, a current pulse of substantially the magnitude $i$ being understood as necessary to switch the polarity of the remanent magnetization of the cores 10 when applied to a switching lead. A current pulse 28 such as that applied at the time T to one of the switching leads by the switch 20 is shown graphically in FIG. 3(*a*). Assuming a current pulse 28 applied to the switching lead 17 by the switch 20 at the time T, this current pulse 28 will appear virtually simultaneously on all of the portions $x$, $y$, and $z$ of the lead 17 with the result that the effect of the pulse 28 on the set cores of the column $g$ will be additive since the pulse 28 appears on both of the portions $x$ and $z$. The effect of a current pulse 28 of twice the magnitude $$\frac{i}{2}$$

will be applied to the set cores *lg*10 and *tg*10 which will be sufficient to cause these cores to be switched to the opposite polarity of remanent magnetization. As soon as the latter cores begin to switch, a voltage will be induced on the read leads 21 of rows $l$ and $t$, these voltages being representative of the information value originally stored in the cores *lg*10 and *tg*10. These voltage signals on the read leads 21 will be introduced via the read amplifiers 25 to the respective logic circuits 26, where the information represented by the voltage signals will be compared with information from external information sources as hereinafter to be described whereupon the information originally read out or new information to be introduced depending upon the comparison made in the logic circuits 26 will be applied through the write amplifiers 27 to the write leads 24 of the rows of cores $l$ and $t$.

A signal representative of the information to be returned to the memory matrix will be applied to the write leads 24 in the form of a current pulse of the magnitude $$\frac{i}{2}$$

suitably synchronized to occur within the time duration of the switching current pulse 28. Thus, referring to FIG. 3, a voltage signal 29 substantially like that induced in the read leads 21 is shown at (*b*). The current pulse 30 of the magnitude $$\frac{i}{2}$$

applied to the write leads as a result of the comparison operation is substantially like that shown at (*c*). The difference in application time of the current pulses 28 and 30 may be of as short a duration as determined by the time required to complete the logic operations. Since the current pulses of the magnitude $$\frac{i}{2}$$

are applied by the write leads 24 of the rows $l$ and $t$ within the duration of the application of the switching current pulse 28 as graphically indicated in FIG. 3, an effective current pulse of the magnitude $i$ will be applied to the cores *lf*10 and *tf*10 with the result that the latter cores will be set, that is, the latter cores will now contain an informational value "1" originally contained in the corresponding cores of the immediately following column of cores $g$. This is readily seen from the fact that the switching current pulse 28 applied by the stepping switch 20 to the switching lead 17 also appears on the portion $y$ of the lead 17, the write lead 24 and the portion $y$ of the lead 17 being understood to thread the cores in a sense such as to result in the setting of the cores.

Obviously, to accomplish the read out and write operation of the present invention, it is necessary that the matrix have a capacity one word greater than the number of words actually storable therein. Thus, the column of cores immediately preceding the column being switched by the current pulses 28 must always be ready to provide room for new information or the information transferring from the column of cores being switched. The information during the read and write operation thus precesses through the matrix with the information stored in the column *a* of the representative matrix shown being returned to the column *n*.

The employment with the magnetic core matrix of this invention of the logic circuits 26 as shown in FIG. 2 makes possible two modes of operation. In the first mode the stored information may be read out and immediately restored without alteration. In the second mode stored information may be replaced by information from an external source. In the illustrative logic arrangement the information is stored in the matrix on a word organized basis, that is, each step of the switch 20 will interrogate all of the cores in a particular column. The logic circuitry however will examine the information read out of the matrix on a group basis, that is, information stored in each of the groups of cores A through N will be examined together.

Assume that it is desired to write a word composed of particular binary values into the matrix the word being divided into distinct groups of the values. It is further desired that this word is to take the place of a word already present in the matrix the latter word having as its second group of values one identical to that of the second group of values of the new word to be introduced. This may be accomplished by storing each of the binary values representing the new word in a flip-flop register circuit 31, the value originally having been supplied by an external row information source 32. Individual circuits 31 and 32 are understood to be associated with each of the rows of cores. The fact of the assumed second requirement stated above, that is, the fact that the new word is to replace a word already in the matrix having an identical second group of values, is introduced in the logic circuit 26 by setting the flip-flop register circuit 33 associated with the second group of rows B. The information setting the flip-flop 33 is supplied by an external group information source 34. The setting of the flip-flop register circuit 33 will operate to match the information values read out with external information values only in the second group of rows.

Upon the sequential operation of the stepping switch 20 words will be read out of the matrix, the bits of which will appear as amplified signals on either of the two input leads 35 or 36 and will be introduced via an OR circuit 37, a cathode follower circuit 38 to a one bit match circuit 39. A match circuit such as the circuit 39 is a circuit of the character which will accept signals from two sources and has a single output. Such a circuit operates to deliver an output signal when the signals from the two sources are similar, that is, both are "1's" or both are "0's." The circuit 39 may be comprised of a combination of AND circuits and OR circuits in a manner well-known to one skilled in the art. Part of the signal is applied to the match circuit 39 in opposite polarity for matching purposes after inversion in an inverting circuit 40.

When a word having, as its first group of values, one which coincides with the values of the first group of values of the new word is read out a match will occur in each of the match circuits 39 of each row of the first group A since the values of the first group read out are identical to those stored in each of the flip-flops 31 of the rows of the first group A. An output signal will accordingly be delivered from each of the match circuits 39 to a group A match AND circuit 41 where, because of the concurrence of signals on each of its inputs, another match will occur with the result that the AND circuit 41 also delivers an output signal. This signal is applied via the cathode follower 42 to a second group A AND circuit 43. The other input to the AND match circuit 43 is connected to the output of the group A flip-flop register circuit 33, which latter circuit, it will be recalled, was not set. Since no signal appears on its other input, no match occurs in the AND match circuit 43 and accordingly no output signal is produced by the latter circuit.

From the group AND match circuit 43 and from similar AND circuits of other groups of rows inputs are provided to an OR circuit 45 common to all of the groups of rows. A single output is paralleled through a cathode follower circuit 46 and an inverter circuit 47 to switches 48 individual to each of the rows of the groups A through N. The switches 48 may conveniently comprise well-known AND and OR circuits. Inputs to the switch 48 are also provided in each of the rows from the output of the flip-flop register circuit 31 and the cathode follower 38. Thus both the information read out from a row of the matrix and the information to replace the latter information stored in the flip-flop 31, if any, is available to the switch 48. When no signal is delivered by the OR circuit 45, as was the case above, the signals of opposite polarities appearing on the outputs of the cathode follower circuit 46 and inverting circuit 47 will control each of the switches 48 in a manner such that the information bits comprising the word read out will be immediately returned to the matrix via the output leads 49 or 50 of the switch 48 through an amplifier 27. Upon which of the leads 49 or 50 the returning information will appear will depend upon which of the synchronizing clock pulse sources 51 or 52 is concurrently operative.

It will be observed that even though the informational values of the first group of the word read out and the word which it is desired to introduce into the matrix are identical, it was the information bits read out that were returned and not the bits stored in the flip-flops 31. Although in fact a match did occur as to the first group of information values, the match was not effective to substitute the entire new word for the one read out.

The above process is repeated upon the sequential operation of the stepping switch 20 with each word precessing through the memory matrix as it is returned to the next preceding column. Finally a word conforming to the requirement imposed is encountered, that is, a word having as its second group of information values a group identical to the second group of the new word to be introduced into the matrix. A match now occurs in the AND circuit 41 serving all of the rows of the second group B and an output signal is delivered via the cathode follower circuit 42 to the group B AND circuit 43. At this time, however, because the group B flip-flop register circuit 33 was set from the external group B information source 34 in accordance with the match requirement imposed, a match occurs in the group B AND circuit 43 and a signal from the latter circuit 43 is delivered to the common OR circuit 45. The signal is passed via the cathode follower circuit 46 and inverter circuit 47 to the switches 48 of each of the rows. Responsive to this applied signal each of the switches 48 inhibits the writing of the information value just read out and gates the writing of the values stored in the flip-flops 31 of each row. These values will then be applied to either of the write leads 49 or 50 as controlled by the synchronizing pulses from the alternating clock pulse sources 51 and 52.

Obviously, in the general description of the logic operation presented, the information values of the second group of bits of the new word to be introduced and with which a match was desired could have been understood to represent the address of the information values represented by the bits of the remaining groups of the word. The matching operation would then constitute an examining and discarding of each word as it is read out of the matrix until the word in the proper address is encountered, that is, a word having the same address as represented by its second group of information values as the new word which is to be substituted for it.

The memory matrix according to the principles of this invention and the associated logic circuitry are considered to be illustrative and other arrangements may advantageously be devised by one skilled in the art. Thus, for example, the operation of writing a new word as controlled by the output of the OR circuit 45 may be utilized to reset all of the flip-flop circuits 31 by means which may readily be devised. In this manner, the logic circuits 26 would be immediately available to again introduce a new word elsewhere in the matrix. In the matrix itself, for example, an economy of leads for the rows of cores may alsa be readily effected by combining the read and write leads in a single lead, the read and write operations then being combined on a time sharing basis.

What is claimed is:

1. In a magnetic core memory circuit, a first and a second magnetic core each having a substantially rectangular hysteresis characteristic and being capable of being switched from one magnetic condition to another, a first lead threading said cores, second leads threading said cores, means for applying a first current pulse to said first lead, said first lead threading said first core a sufficient number of times to switch said first core but threading said second core an insufficient number of times to switch said second core, and means controllably responsive to the switching of said first core for applying a second current pulse to one of said second leads during the application of said first current pulse on said first lead to switch said second core.

2. In a magnetic core memory circuit in accordance with claim 1, said first and said second current pulses being of equal magnitude and said first lead threading said second core one less number of times than said first core.

3. In a magnetic core memory circuit, a plurality of magnetic cores having substantially rectangular hysteresis characteristics and being capable of being switched from one magnetic condition to another, a plurality of selecting leads associated respectively with said plurality of cores, each of said selecting leads threading a first core of said plurality of cores a predetermined number of times and a second core of said plurality of cores less than said predetermined number of times, a plurality of second leads threading said second cores, means for applying a first current pulse to a particular one of said selecting leads for switching only a particular first core, and means controllably responsive to the switching of said particular first core for applying a second current pulse to a particular one of said second leads during the application of said first current pulse on said particular one of said first leads to switch the one of said second cores threaded by said particular one of said first leads and said particular one of said second leads.

4. A memory circuit comprising a plurality of magnetic cores arranged in rows and columns, said cores having substantially rectangular hysteresis characteristics and being capable of switching from one magnetic condition to another, a plurality of first leads associated respectively with said columns of cores, each of said first leads threading the core of its associated column and the cores of another column, a plurality of second leads threading the cores of respective rows of cores, means for applying a first current pulse to a first lead, said first lead threading the cores of its associated column a number of times sufficient to switch particular cores in said assoicated column but threading the cores of said other column a number of times insufficient to switch cores in said other column, and means controllably responsive to the switching of said particular cores in said first group for applying second current pulses to second leads threading the rows of cores including corresponding particular cores in said other column concurrently with the application of said first current pulse to said first lead to switch the particular cores in said other column.

5. A magnetic core circuit comprising a plurality of magnetic cores having substantially rectangular hysteresis characteristics and being capable of being switched from one magnetic condition to another, a plurality of first leads threading first and second groups of cores of said plurality of cores respectively, a plurality of second leads threading corresponding cores of said first and said second groups of cores, means for applying a first current pulse to one of said first leads, said first lead threading its first group of cores a sufficient number of times to switch particular cores in said first group but threading its second group of cores an insufficient number of times to switch cores in said second group, and means controllably responsive to the switching of said particular cores in said first group for applying a second current pulse to the second leads threading corresponding particular cores in said second group concurrently with the application of said first current pulse to said first lead to switch said particular cores in said second group.

6. A memory circuit comprising a plurality of magnetic cores each having a first and a second condition of magnetic remanence and each being capable of switching from one of said magnetic conditions to the other, said cores being arranged in rows and columns, a plurality of first leads threading first and second columns of cores, a plurality of pairs of second leads, each lead of said pairs of second leads threading alternate cores of said rows of cores, means for applying a first current pulse to a first lead, said first lead threading said first column of cores a sufficient number of times to switch particular cores in said first column but threading said second column of cores an insufficient number of times to switch cores in said second column, and means controllably responsive to the switching of said particular cores in said first column for applying a second current pulse to ones of said pairs of second leads threading the cores in said second column included in the rows also including said particular cores of said first column for switching said cores in said second column.

7. A memory circuit comprising a plurality of magnetic cores capable of assuming a first and a second stable remanence condition, said cores being arranged in rows and columns, a plurality of switching leads thereading respectively first and second columns of cores, a plurality of pairs of sensing leads associated with said rows of cores, the individual ones of said pairs of sensing leads respectively threading cores in said first and said second columns of cores, a plurality of pairs of write leads associated with said rows of cores, the individual ones of said pairs of write leads respectively threading cores in said first and said second columns of cores, means for applying a first current pulse to a switching lead, said switching lead threading its first column of cores a sufficient number of times to switch particular cores in said first column to induce signals in the sensing leads thereading said particular cores and said switching lead also threading its second column of cores an insufficient number of times alone to switch cores in its second column, and means responsive to said signals on said sensing leads for applying a second current pulse to the ones of said pairs of write leads threading the cores in said second column and in the rows also including said particular cores in said first column to switch said cores in said second column.

8. In an information storage system, a memory matrix comprising an array of magnetic cores having substantially rectangular hysteresis characteristics and being capable of switching from one magnetic condition to another responsive to a current pulse of a particular magnitude, said cores being arranged in rows and columns, a switching lead for each of said columns, said switching lead being threaded fewer times through the cores of one column than through the cores of another column, a pair of sensing leads and a pair of write leads for each of said rows, the sensing leads and the write leads of each of said pairs being threaded through alternate cores of said rows, a first pulse source for applying a first current pulse of less than said particular magnitude to a switching lead to switch particular cores in said other column of cores to induce a signal in particular ones of said sensing leads, and a second pulse source for applying a second current pulse of less than said particular magnitude to particular ones of said write leads controllably responsive to said signals, said switching lead and said particular write leads being arranged such that said first and said second current pulses cooperate to switch the cores defined by said switching lead and said particular write leads.

9. A magnetic core circuit comprising a plurality of magnetic cores capable of assuming a first and a second stable remanence condition, a switching lead threading a first of said cores a predetermined number of times, a sensing lead threading said first core, a write lead, means for applying a first current pulse to said switching lead to switch said first core and induce a signal in said sensing lead, and means for applying a second current pulse to said write lead responsive to said signal, said switching lead and said write lead threading a second core such that said first and said second current pulses cooperate to switch said second core.

10. A memory circuit comprising rows and columns of magnetic cores, said cores having substantially rectangular hysteresis characteristics and being capable of switching from one magnetic condition to another, a plurality of switching, sensing, and write leads, means for applying a first current pulse to one of said switching leads, said switching lead threading a first column of cores such as to switch particular cores in said first column, said particular cores in said first column having sensing leads threaded therethrough such as to induce signals thereon responsive to said core switching, and means responsive to said signals, for applying a second current pulse to ones of said write leads, said switching lead and said ones of said write leads threading particular cores in a second column of cores such that said first and said second current pulses cooperate to switch said particular cores in said second column.

11. An information processing system comprising a memory matrix comprising magnetic cores arranged in rows and columns, said cores having a substantially rectangular hysteresis characteristic and capable of being switched from one condition of saturation to another, a plurality of switching leads individually threading first and second columns of cores, means for sequentially applying first current pulses to said switching leads, said switching leads threading the cores of said first columns such as to switch particular cores of said first columns, a plurality of sensing leads threading the cores defined by said rows and said first columns, ones of said sensing leads threading the particular cores of said first column such as to have signals induced thereon by said switching of said particular cores of said first column, a plurality of write leads threading the cores defined by said rows and said second columns, and means responsive to predetermined signals on said ones of said sensing leads for applying second current pulses to the ones of said write leads threading the cores defined by said second column and said rows including said particular cores of said first columns, said switching leads and said last-mentioned write leads threading said last-mentioned cores in said second column such that said first and said second current pulses cooperate to switch said last-mentioned cores.

12. An information processing system according to claim 11 in which said switching leads individually thread said first columns a predetermined number of times and said second columns less than said predetermined number of times.

13. An information processing system according to claim 12 in which said first current pulses are equal in magnitude to said second current pulses.

14. An information processing system according to claim 13 in which said second current pulses are at least partially coextensive in time with said first current pulses.

15. A magnetic core circuit comprising rows and columns of magnetic cores, said cores being capable of assuming a first and a second condition of magnetic saturation, a switching lead for each of said columns, said switching lead threading the cores of a first column and a preceding second column, a sensing and a write lead for each alternate core of each of said rows, means for applying a first current pulse to one of said switching leads, said switching lead threading the cores of its first column a sufficient number of times to switch particular cores in said first column to induce signals in the sensing leads threading said particular cores, and means for applying a second current pulse to the write leads threading the cores defined by the rows including said particular switched cores and the preceding second column responsive to said signals on said sensing leads and within the time duration of said first current pulse to switch said cores so defined.

16. A magnetic core circuit comprising a plurality of magnetic cores in a row, each of said cores being capable of assuming a first and a second stable magnetic state, means for simultaneously applying a first pulse to two adjacent cores in said row, said first pulse being of sufficient magnitude to switch the magnetic state of a first of said cores to read out information stored therein but being insufficient to switch the magnetic state of the second of said cores, and means responsive to the switching of said first core for applying a partial switching pulse to said second core during the duration of said first pulse to restore the information from said first core in said second core.

17. In an information storage system, a memory matrix comprising rows and columns of magnetic cores having substantially rectangular hysteresis characteristics, means for simultaneously applying first switching current pulses twice to the cores of a first column and once to the cores of a second column to read out information stored in said cores of said first column, and means for applying second switching current pulses to particular cores of said second column concurrently with said first switching current pulses to restore information to said matrix as determined by the character of said information read out.

18. The method of processing information stored in a square loop magnetic core memory matrix comprising the application of a first current pulse simultaneously to a first column of cores twice and to a second column of cores once to read out information stored in said first column, the comparison of said information read out of said first column with predetermined information, the application of a second current pulses to a particular row of cores responsive to said comparison, and the combination of said first and said second current pulses to write information back in the core defined by said second column and said particular row.

References Cited in the file of this patent

UNITED STATES PATENTS

| | | |
|---|---|---|
| 2,673,293 | Eckert | Mar. 23, 1954 |
| 2,691,155 | Rosenberg | Oct. 5, 1954 |
| 2,700,148 | McGuigan | Jan. 18, 1955 |
| 2,914,754 | Ganzhorn et al. | Nov. 24, 1959 |